United States Patent
Yoshida et al.

(10) Patent No.: US 10,564,325 B2
(45) Date of Patent: *Feb. 18, 2020

(54) PROTECTIVE FILM-ATTACHED FUNCTIONAL SHEET

(71) Applicants: MITSUBISHI GAS CHEMICAL COMPANY, INC., Tokyo (JP); MGC FILSHEET CO., LTD., Saitama (JP)

(72) Inventors: Ryuji Yoshida, Tokorozawa (JP); Toshihiko Takano, Tokyo (JP)

(73) Assignees: MITSUBISHI GAS CHEMICAL COMPANY, INC., Tokyo (JP); MGC FILSHEET CO., LTD., Saitama (JP)

(*) Notice: Subject to any disclaimer, the term of this patent is extended or adjusted under 35 U.S.C. 154(b) by 315 days.

This patent is subject to a terminal disclaimer.

(21) Appl. No.: 15/523,782

(22) PCT Filed: Nov. 18, 2015

(86) PCT No.: PCT/JP2015/082420
§ 371 (c)(1),
(2) Date: May 2, 2017

(87) PCT Pub. No.: WO2016/080445
PCT Pub. Date: May 26, 2016

(65) Prior Publication Data
US 2017/0322344 A1 Nov. 9, 2017

(30) Foreign Application Priority Data
Nov. 21, 2014 (JP) .................. 2014-236743

(51) Int. Cl.
| | | |
|---|---|---|
| *G02B 1/12* | (2006.01) | |
| *B29D 11/00* | (2006.01) | |
| *B32B 27/08* | (2006.01) | |
| *B32B 27/30* | (2006.01) | |
| *B32B 27/32* | (2006.01) | |
| *G02B 5/23* | (2006.01) | |
| *G02B 5/30* | (2006.01) | |
| *B32B 27/36* | (2006.01) | |

(Continued)

(52) U.S. Cl.
CPC .............. *G02B 1/12* (2013.01); *B29C 45/14* (2013.01); *B29C 45/14336* (2013.01); *B29D 11/00009* (2013.01); *B32B 25/08* (2013.01); *B32B 25/14* (2013.01); *B32B 27/08* (2013.01); *B32B 27/30* (2013.01); *B32B 27/306* (2013.01); *B32B 27/32* (2013.01); *B32B 27/36* (2013.01); *B32B 27/365* (2013.01); *C09J 7/20* (2018.01); *G02B 5/23* (2013.01); *G02B 5/30* (2013.01); *B29K 2023/12* (2013.01); *B29K 2069/00* (2013.01); *B29K 2623/12* (2013.01); *B29K 2629/04* (2013.01); *B29K 2669/00* (2013.01); *B29K 2995/0034* (2013.01); *B29L 2011/0016* (2013.01); *B32B 2250/24* (2013.01); *B32B 2250/40* (2013.01); *B32B 2255/10* (2013.01); *B32B 2255/24* (2013.01); *B32B 2307/30* (2013.01); *B32B 2307/40* (2013.01); *B32B 2307/402* (2013.01); *B32B 2307/42* (2013.01); *B32B 2307/732* (2013.01); *B32B 2551/00* (2013.01); *B32B 2571/00* (2013.01); *B32B 2571/02* (2013.01)

(58) Field of Classification Search
CPC ........ B29D 11/00009; B29D 11/00644; G02B 1/12; G02B 5/23; G02B 5/30; G02B 1/14; B29C 45/14; B29C 45/14336; B29C 45/14811; B32B 7/02; B32B 7/12; B32B 27/06; B32B 27/302; B32B 27/306; B32B 27/30; B32B 27/32; B32B 27/36; B32B 27/08; B32B 27/365

See application file for complete search history.

(56) References Cited

U.S. PATENT DOCUMENTS 9,618,658 B2 * 4/2017 Yoshida ............ B29C 45/14811
2014/0375945 A1 12/2014 Tokumaru et al.

FOREIGN PATENT DOCUMENTS

| CA | 103842893 A | 6/2014 |
|---|---|---|
| CN | 105308485 A | 2/2016 |

(Continued)

OTHER PUBLICATIONS

Chinese Office Action in corresponding Chinese Application No. 201580062704.4 dated Oct. 8, 2018.

(Continued)

*Primary Examiner* — Mathieu D Vargot
(74) *Attorney, Agent, or Firm* — Greenblum & Bernstein, P.L.C.

(57) ABSTRACT

A protective film-attached functional sheet includes a protective film bonded to a functional sheet including aromatic polycarbonate sheets and a functional layer sandwiched between the aromatic polycarbonate sheets, the functional layer being a polyvinyl alcohol polarizing film layer, a photochromic layer, or a combination. The protective film is a polyolefin resin film that includes at least two layers: a base layer formed of a polypropylene having a melting point equal to or higher than a glass transition temperature of the aromatic polycarbonate and an adhesive layer on one surface of the base layer and being a resin composition containing a polyolefin rubber and a polyolefin having a melting point lower than the glass transition temperature but equal to or higher than 15° C. lower than the glass transition temperature; or at least three layers: the aforementioned two layers and an intermediate layer between the base layer and the adhesive layer.

11 Claims, No Drawings

(51) Int. Cl.
      *B29C 45/14*    (2006.01)
      *B32B 25/08*    (2006.01)
      *B32B 25/14*    (2006.01)
      *C09J 7/20*     (2018.01)
      *B29K 23/00*    (2006.01)
      *B29K 69/00*    (2006.01)
      *B29K 623/00*   (2006.01)
      *B29K 629/00*   (2006.01)
      *B29K 669/00*   (2006.01)
      *B29L 11/00*    (2006.01)

(56) References Cited

FOREIGN PATENT DOCUMENTS

| | | |
|---|---|---|
| JP | 2003-145616 | 5/2003 |
| JP | 2009-198753 | 9/2009 |
| JP | 2011-37243 A | 2/2011 |
| JP | 2011-110879 | 6/2011 |
| TW | 201339623 A | 10/2013 |
| WO | 2013/051723 | 4/2013 |
| WO | 2014/189078 | 11/2014 |

OTHER PUBLICATIONS

International Search Report issued in WIPO Patent Application No. PCT/JP2015/082420, dated Feb. 16, 2016.
International Preliminary Report on Patentability issued in Patent Application No. PCT/JP2015/082420, dated May 23, 2017.
Taiwanese Office Action and Search Report dated Apr. 3, 2019 in corresponding Taiwanese Application No. 104138513.

\* cited by examiner

PROTECTIVE FILM-ATTACHED FUNCTIONAL SHEET

TECHNICAL FIELD

The present invention relates to a functional sheet in which an aromatic polycarbonate sheet or film is used as a protective layer of a functional layer such as a polarizing film layer or a photochromic layer, and to a protective film-attached functional sheet having a protective film temporarily attached to a surface of the functional sheet to protect the surface during distribution, processing steps, etc.

BACKGROUND ART

An aromatic polycarbonate sunglass lens is typically produced by punching a functional sheet, in which an aromatic polycarbonate sheet or film is used as a protective layer of a functional layer such as a polarizing film layer or a photochromic layer, into a desired shape, heat-bending the punched piece into a partial sphere, injection-molding an aromatic polycarbonate for lenses onto a concave surface side of the partial sphere, and performing a surface treatment or the like as needed.

A protective film is attached to this functional sheet so that the surface of the functional sheet is protected from contamination and foreign matter during distribution, processing steps, etc. In particular, there has been proposed a polyolefin protective film that can withstand heat-bending in a high-temperature environment near the glass transition temperature of the aromatic polycarbonate (PTL 1 and PTL 2).

PTL 1 discloses a double (structure) protective film in which a polyolefin film having a substantive melting point of 150° C. or higher is provided as the surface layer and a polyolefin film having a substantive melting point of 125° C. to 145° C. is provided as the film layer for adhesion or bonding.

PTL 2 discloses a co-extruded polyolefin film as a protective film, in which the polyolefin film has a melting peak (A) at 105° C. to 130° C. and a melting peak (B) at 160° C. to 175° C. and the melting peak area ratio [(A)/(B)] is 35/65 to 80/20.

PTL 1 and PTL 2 describe evaluation (effects) after heat bending but do not mention the injection-molded lens prepared by loading a heat-bent product to an injection molding mold or evaluation of the injection-molded lens.

When such a protective film-attached functional sheet is punched into a desired shape and heat-bent to form a partial sphere or the like, the heat-bent product is loaded on an injection molding mold, and an aromatic polycarbonate for lenses is injection-molded onto a concave surface from the gate at the side surface to prepare a lens molded product (hereinafter referred to as an injection lens), streaks of white color (hereinafter referred to as white streaks) sometimes occur and this has been recognized as an appearance defect, which poses a problem.

In particular, as demand for improving productivity increases, the requirements posed on the production, such as improved operation efficiency of equipment and a shorter production time, have become increasingly severe. As such issues are addressed, the frequency of occurrence of "white streaks" defects has shown an increasing tendency and an urgent solution is desirable.

CITATION LIST

Patent Literature

PTL 1: Japanese Unexamined Patent Application Publication No. 2003-145616
PTL 2: Japanese Unexamined Patent Application Publication No. 2011-110879

SUMMARY OF INVENTION

Technical Problem

An object of the present invention is to provide a protective film-attached functional sheet from which an aromatic polycarbonate injection-molded lens that has no or significantly less white streaks can be produced.

The "white streaks" were analyzed as to their components and the presence of polyolefin resin was confirmed.

Samples of heat-bent products were observed and it was confirmed that in some samples, resin adhering to the punched section presumably derived from the protective film was observed. In samples in which the sections were cleaned with a knife or the like, no white streaks were observed.

The heat-bent product is loaded onto a mold after the protective film is detached and then injection molding is performed. The white streaks that occur during this process are caused by the adhering resin remaining on the punched section after detachment of the protective film. Presumably, the resin adhered so strongly to the section that the resin had separated by the peeling force or the resin broke into fragments and adhered to the section. The series of tests were performed according to the description of Examples below.

A correlation was confirmed between the frequency of occurrence of the "white streaks" and the number of times punching was conducted.

If the number of times punching is conducted is small, the frequency is low. The frequency increases with the number. The punching blade whose due time for replacement or whetting is near no longer has a sharp edge due to wear.

If the blade is no longer sharp or chipped, the protective film is cut after it is stretched by some extent. Specifically, the edge penetrates into the protective film to a particular extent, and the protective film is stretched and then cut between the edge and a backing plate. Then the punching blade is set back and punching operation is completed. According to this process, the protective film is pressurized and cut after a stretched portion is formed. The part that is extensively stretched, the part cracked by stretching, and the part that has broken into fragments by rupture remains on the section ends.

The punched piece of the protective film-attached functional sheet is heat-bent.

Heat bending is performed by gradually deforming the punched piece while heating the punched piece to a temperature at which the protective sheet of the functional layer can be easily bent, i.e., can be bent with small stress. This temperature is 135° C. to 145° C. at most, which is lower than the glass transition temperature of the aromatic polycarbonate resin constituting the protective sheet.

Naturally, the protective film reaches this temperature and, as a result, the resins having melting points lower than this temperature are melted. Since melting occurs in all parts, a resin whose peel strength to the aromatic polycarbonate resin surface increases significantly by melting is unsuitable for the adhesive layer or the attachment layer.

As mentioned above, the resins in the stretched part at the section ends, the fragmented part, and the cracked part also melt and flow, and in some cases, solidify at the site they reached by flowing. As a result, the resins adhere or bond to that site.

A section end surface of the heat-bent product was observed with a microscope. Observation revealed that a protective film end projected outward from the punched section end surface of the aromatic polycarbonate sheet and collapsed.

The size of collapsed projections was in the range of about 100 μm to 600 μm depending on the type of the protective film used.

Whether or not there was residue adhering to the section end surface after the detachment of the protective film was not confirmed.

The protective film was detached from the heat-bent product and an injection-molded lens was produced. As a result, a correlation was confirmed between the size of the collapsed projections and occurrence of white streaks.

The protective film that has detached from the base layer by melt flow remains at the section ends. Pieces of the protective film that have detached from the main body of the protective film detached before loading onto a mold also remain at the section ends because they have become fine and thin at the portion connected to the base layer at the section end and could not withstand the peel strength. The residue tends to remain when the size of the collapsed projections is large. The residue moved by being melted and dragged by the injected molten aromatic polycarbonate creates traces that appear as white streaks.

In view of the above, the protective films were evaluated by selecting the conditions under which white streaks occur highly frequently and the conditions of the heat bending and by using a punching blade whose edge was no longer sharp. Then a protective film-attached functional sheet from which an aromatic polycarbonate injection-molded lens that has no or significantly less white streaks can be produced was found.

However, this developed product was found to have a drawback that the range of the preferable peel strength is narrow. For example, in some cases in which the temperature of heat bending was high, the protective film was difficult to detach at the time of loading the product onto the mold due to an increased adhesiveness. To overcome this drawback, the peel strength was decreased but detachment wrinkles occurred from around the protective film during heat bending and additives of the adhesive layer of the protective film precipitated in the gaps and remained on the surface by forming micro crystals, thereby causing clouding. Due to these reasons, a product that does not generate detachment wrinkles at a smaller peel strength or a product whose increase in peel strength by heat bending is smaller have been pursued.

In some cases, irregularities and other defects such as warps of surfaces were observed in the surface of the heat-bent product.

A more detailed surface observation of the irregularities revealed that there were cases in which recesses were observed in the surface of the protective film and these recesses coincided with the recesses in the surface of the heat-bent product. This occurred more frequently when the level of cleanliness (dust-free) of the operation environment was low. It was assumed that the dust was the cause thereof.

However, even in the working environment in which irregularities occurred and were observed in a developed product with no white streaks, irregularities were not substantially observed in a double-structure protective film of the related art in which white streaks occur. Similarly, irregularities were hardly observed in some pilot samples of the protective films that do not generate white streaks in the course of development.

The most distinctive difference between the two is whether or not there is a resin layer that causes white streaks. In other words, whether or not there is a resin layer that melts and flows during heat bending. When dust about ten to several ten micrometers in size adheres to the surface of the heat bending mold, the adhering dust pushes down the protective film base layer of a developed product that does not have a melt flow layer and does not generate white streaks; thus, the adhesive layer is pressed down and the dust reaches the surface of the heat-bent product to create recesses. However, it is presumed that, in a product that has a melt flow layer and generates white streaks, the portion where the dust adheres pushes down the protective film base layer but the adhesive layer melts, flows, and deforms, and thus the dust does not substantially reach the surface of the heat-bent product.

In order to resolve this issue regarding dust, the cleanliness of the production environment should be severely managed. However, this raises the production cost and complicates the production process.

When the protective film of a heat-bent product is detached and the heat-bent product is observed by allowing the light such as one from a fluorescent lamp to transmit therethrough, a transmitted image of the light source is observed as an irregular disturbed image. This phenomenon is called "warps of surfaces". Observation of the surface of the protective layer of the same heat-bent product through the transmitted light revealed that the surface of the protective layer had changed its shape and was undulating according to the disturbed image. Specifically, the difference in level at the portions where the shape has changed is not as large as that of the irregularities described above; and the change in the shape of the surface is spread unevenly over the surface of the heat-bent product and is so small that the boundaries between the changed portions is not clear and a microscope cannot capture the change.

Warps of surfaces occur extensively in the developed product that does not generate white streaks. The extent of warps of surfaces is not as large as the developed product or is not large enough to be observed as warps of surfaces according to the double-structure protective film of the related art that generates white streaks.

The most distinctive difference between the two for this point also is whether or not there is a resin layer that melts and flows during heat bending. Specifically, during heat bending, the protective film of the developed product free of a resin layer that melts and flows does not follow the change that occurs in the shape of the heat-bent product during heat-bending and thus local stress load is generated and the surface of the heat-bent product is strained within a minute range, resulting in warps of surfaces. In contrast, it is presumed that, with a white-streak-occurring product that has a melt flow layer, the adhesive layer that melts and flows during heat-bending easily follows the change that occurs in the shape of the surface of the heat-bent product and prevents warps of surfaces.

In view of the above, what is desired is a product that satisfies the following conditions: that the product has a resin layer that melts during heat bending in a manner similar to the resin layer that is included in a co-extruded double-layer-structure or a double structure and causes white streaks; and that this resin layer does not substantially adhere to the punched section surface even when the resin layer has melted.

The inventors of the present invention made pilot products of a protective film that had a resin layer, as an intermediate layer, that melted under heat bending conditions and conditions in which white streaks occur frequently. Then aromatic polycarbonate injection-molded lenses were made by using the protective film and evaluated. As a result, a novel protective film-attached functional sheet was found.

Solution to Problem

The present invention provides the following:
(1). A protective film-attached functional sheet including a functional sheet and a protective film bonded to the functional sheet, the functional sheet including aromatic polycarbonate sheets or films and a functional layer sandwiched between the aromatic polycarbonate sheets or films, the functional layer being a polyvinyl alcohol polarizing film layer, a photochromic layer, or a combination thereof, wherein the protective film is a polyolefin resin film that includes at least two layers which are a base layer formed of a polypropylene having a melting point equal to or higher than a glass transition temperature of the aromatic polycarbonate and an adhesive layer disposed on one surface of the base layer and being formed of a resin composition containing a polyolefin rubber and a polyolefin having a melting point lower than the glass transition temperature but equal to or higher than a temperature 15° C. lower than the glass transition temperature.

In the present invention described in (1) above,
(2). The polypropylene constituting the base layer is a low-density polypropylene having a melting point of 150° C. to 170° C. and the base layer has a thickness of 10 to 60 μm.
(3). The polyolefin constituting the adhesive layer is a low-density polyolefin having a melting point of 135° C. to 145° C. and the adhesive layer has a thickness of 5 to 30 μm.
(4). A polyolefin resin layer having a melting point lower than that of the base layer is disposed between the base layer and the adhesive layer.
(5). The polyolefin resin layer has a low density, a melting point of 120° C. to 145° C., and a thickness of 20 to 60 μm.

The present invention also provides the following:
(6). A method for producing a functional aromatic polycarbonate injection-molded lens, the method including preparing a protective film-attached functional sheet by bonding a protective film onto a functional sheet that includes aromatic polycarbonate sheets or films and a functional layer interposed between the aromatic polycarbonate sheets or films, the functional layer being selected from a polyvinyl alcohol polarizing film layer, a photochromic layer, and a combination thereof; punching the protective film-attached functional sheet into a desired shape; heat-bending the punched piece; detaching the protective film; loading the resulting piece onto a mold; injection-molding an aromatic polycarbonate resin; and taking out the resulting molded product, wherein the protective film is a polyolefin resin film that includes at least two layers which are a base layer formed of a polypropylene having a melting point equal to or higher than a glass transition temperature of the aromatic polycarbonate and an adhesive layer disposed on one surface of the base layer, the adhesive layer being formed of a resin composition containing a polyolefin rubber and a polyolefin having a melting point lower than the glass transition temperature but equal to or higher than a temperature 15° C. lower than the glass transition temperature.

In the invention of (6) above,
(7). The heat-bending involves gradually deforming the punched piece at most at a temperature 15° C. to 5° C. lower than the glass transition temperature of the aromatic polycarbonate.
(8). The polypropylene constituting the base layer is a low-density polypropylene having a melting point of 150° C. to 170° C. and the base layer has a thickness of 10 to 60 μm.
(9). The polyolefin constituting the adhesive layer is a low density polyolefin having a melting point of 135° C. to 145° C. and the adhesive layer has a thickness of 5 to 30 μm.
(10). A polyolefin resin layer having a melting point lower than that of the base layer is disposed between the base layer and the adhesive layer.
(11). The polyolefin resin layer has a low density, a melting point of 120° C. to 145° C., and a thickness of 20 to 60 μm.

DESCRIPTION OF EMBODIMENTS

Protective Film

A protective film according to the present invention includes at least two layers, namely, a base layer and an adhesive layer (or a bonding layer) or at least three layers, namely, a base layer, an adhesive layer, and an intermediate layer between the base layer and the adhesive layer. The thickness of the protective film is preferably selected in the range of 50 to 100 μm.

The base layer is a layer mainly used for achieving the original function of the protective film, that is, a function of protecting from scratching, contamination, and foreign matter the surface of a functional sheet during the distribution stage and in handling such as in processing steps. A film having an appropriate film strength is selected as the base layer. The base layer does not crack and form fragments in the punching step, does not separate from the adhesive layer, and does not melt and bond even when exposed to an atmosphere at a temperature near the glass transition temperature of the aromatic polycarbonate in the heat bending step. The base layer is a layer that stays bonded to the adhesive layer or bonding layer that has become substantially molten.

When a stack of a large number of protective film-attached functional sheets is to be stored for a long time, the surfaces of the protective films come into close contact under pressure and this state is maintained for a long time. In order to prevent blocking, i.e., un-separable fixing, a surface layer harder than the protective film is provided or a layer containing an anti-blocking agent is provided as the surface layer of the base layer.

The base layer does not melt during the heat bending step. The base layer may be composed of a polypropylene having a melting point (peak temperature in DSC measurement) equal to or higher than the glass transition temperature of the aromatic polycarbonate. The polypropylene preferably has a melting point of 150° C. to 170° C. and more preferably 155° C. to 165° C. The polypropylene is preferably a low-density polypropylene. The thickness is 10 to 60 μm, preferably 10 to 50 μm, and more preferably 10 to 40 μm. A high-density polypropylene is brittle and cut residues easily occur due to cracking or the like. If the polypropylene has a low melting point, the strength of the base layer decreases and the problems such as degradation of shape retention are likely to arise.

The protective film may show no clear melting point peak in thermal measurement. In particular, the resin used in the adhesive layer has a lower density and has a lower thickness ratio and thus usually a low and gentle melting point peak shape is observed. Moreover, in the present invention, since the composition contains a polyolefin rubber, the rising edge on the lower-temperature side of the melting point peak of the base layer must be carefully identified.

The adhesive layer (or a temporary attachment layer) is a layer that keeps bonding to the base layer or the intermediate layer of the protective film and is also a layer that makes close-contact with the surface of the aromatic polycarbonate and enables clean detachment without leftover adhesive. Examples of the adhesive layer include a layer that does not separate from the aromatic polycarbonate surface to be protected during the punching step, does not separate from the base layer, and stays bonded to the base layer even in a molten state as mentioned above; a layer that has a melting viscosity having a small temperature dependence; and a layer that does not have a clear melting point, for example, a layer formed of a low-density product with degraded regularity or formed of a branched structure.

The adhesive layer is formed of a resin composition that contains a polyolefin having a melting point lower than a glass transition temperature of the aromatic polycarbonate but equal to or higher than a temperature 15° C. lower than the glass transition temperature, and a polyolefin rubber. The melting point of the polyolefin is preferably 135° C. to 145° C. The polyolefin is preferably a low-density polyolefin. The polyolefin is preferably a polypropylene. The thickness of the adhesive layer is not limited but is usually preferably selected from 5 to 30 µm.

The polyolefin constituting the adhesive layer has insufficient adhesiveness to the aromatic polycarbonate when it is used alone and press-bonded at room temperature. The melting point is preferably not excessively low since the polyolefin exhibits adhesiveness even when it is used alone, the adhesiveness significantly increases during heat bending, and the adhesiveness does not sufficiently decrease even when the polyolefin is cooled to room temperature. In contrast, when the melting point is excessively high, the amount of the polyolefin rubber component, which is a component for achieving the required adhesiveness, must be increased and the peel strength to the base layer is degraded, which is not preferable. In other embodiments, an excessively high melting point decreases the peel strength to the intermediate layer, which is a constitutional element of the protective film, and thus the excessively high melting point is not preferable.

The polyolefin rubber used in the present invention is obtained by using ethylene or propylene as a major monomer and by copolymerizing the major monomer with an α-olefin (such as 1-butene) or an unconjugated diene as needed. A typical example is an ethylene-propylene rubber (EPDM or EPM). For special occasions, 1-butene or the like usually used as a third component may be used as one of the major components. An example thereof is a propylene-butene rubber.

The drawbacks generally recognized are poor adhesiveness and slow vulcanization rate despite excellent ozone resistance, weather resistance, and heat resistance; however, excellent adhesives and vulcanizing agents have been developed. These are copolymers that have a sub-zero glass transition temperature before crosslinking, are highly viscous liquid at room temperature before crosslinking, have a melting point higher than room temperature and lower than that of low-density polyethylene, and usually have a weight-average molecular weight in the range of 10,000 to 200,000 before crosslinking. Some class of commercial products presumably belonging to EPM, which are rubber copolymers free of non-conjugated dienes, have their melting points indicated.

The compositional ratios of the low-density polyolefin and the polyolefin rubber contained in the adhesive layer may be selected so that the olefin rubber component accounts for 20% to 60% and preferably 28% to 52% of the resin composition.

One of the issues that arise regarding adhesion (or temporary attachment) is the change in peel strength over time. For this purpose also, naturally, the change overtime is preferably substantially zero. For example, the change overtime may undesirably increase the peel strength. This may cause blocking, i.e., un-separable fixing, and render the product unfit for use. Since the peel strength of the present invention is low compared to the values of other common adhesives, the peel strength usually does not pose a problem; however, a consideration must be made.

The protective film according to the present invention must include at least two layers, i.e., a base layer and an adhesive layer (or temporary attachment layer). An auxiliary layer or an intermediate layer formed of a polyolefin resin layer having a lower melting point than the base layer may be disposed between the base layer and the adhesive layer (or temporary attachment layer) or on the inner layer side of the base layer. The auxiliary layer or intermediate layer is in close contact with the base layer and the adhesive layer.

When an intermediate layer is provided, the polyolefin resin layer that constitutes the intermediate layer is formed of a polyolefin having a melting point equal to or higher than the temperature 40° C. lower than the glass transition temperature of the aromatic polycarbonate and equal to or lower than the temperature 5° C. lower than the glass transition temperature. The melting point thereof is preferably 120° C. to 145° C. and the thickness is 20 to 60 µm. The intermediate layer enters a molten state during heat bending and absorbs local stress load. Moreover, since the intermediate layer is restrained by being clamped between the base layer and the adhesive layer (or temporary attachment layer), the intermediate layer does not easily flow by itself and rarely separates from the protective film main body.

When the melting point of the polyolefin constituting the intermediate layer is decreased to about 120° C., the thickness may be decreased to about 20 µm to suppress separation from the film main body. When the melting point of the polyolefin constituting the intermediate layer is increased to about 140° C., the thickness may be adjusted to about 40 µm so as to enhance the effect of absorbing stress. These choices may be appropriately made in view of heat bending conditions and the work environment.

When the melting point of the intermediate layer is higher than the above-described melting point range, the intermediate layer does not melt or flow during heat-bending of the punched piece and does not sufficiently absorb stress. Thus, detachment wrinkles, irregularities, and warps of surfaces remain unresolved. When the melting point of the intermediate layer is lower than the above-described melting point range, the intermediate layer that has become molten during the heat bending flows alone under stress of the decrease or increase in pressure during heat bending, protrudes from the protective film base layer or the adhesive layer, and attaches to the section of the heat-bent product or separates and becomes affixed to the section. This is not preferable since a defect similar to white streaks appears when injection molding is performed on the heat-bent product after detachment of the protective film.

The protective film according to the present invention is usually produced by a co-extrusion method.

At least two extruders for the base layer (core layer) and the adhesive layer (or bonding layer) or three extruders including an extruder for the intermediate layer in addition to the two extruders are used to respectively melt-extrude the resins under respective conditions. The molten resins are made to come into layer-contact through a co-extrusion die, extruded from a die lip, and drawn onto a roll so as to form a protective film. In co-extrusion, a stabilizer, a releasing agent, a lubricant, and the like may be added in small amounts as needed to achieve more even extrusion and control adhesion to the rolls or the like.

Functional Sheet

A functional sheet having a surface protected by the protective film described above adhered to or temporarily attached with an adhesive is a laminate constituted by aromatic polycarbonate sheets or films and a functional layer sandwiched between the aromatic polycarbonate sheets or films, the functional layer being selected from a polyvinyl alcohol polarizing film layer, a photochromic layer, and a combination thereof.

The functional layer formed of a polyvinyl alcohol polarizing film layer is a stretched polarizing film typically prepared by causing a dichroic organic dye to adsorb to a polyvinyl alcohol resin film being monoaxially stretched in an aqueous solution. The polarizing film is monoaxially stretched at a stretching factor of 3.5 to 6.5 and, if needed, treated with boric acid or a metal compound.

The photochromic layer is a layer formed of a mixture of a transparent resin and a photochromic compound (photochromic material). Examples of the photochromic material include spirooxazine materials, spiropyran materials, fulgide materials, diarylethene materials, and salicylidene aniline materials. An appropriate one of these may be used.

The aromatic polycarbonate sheets or films have a thickness of 0.1 to 1 mm and preferably 0.2 to 0.5 mm. The retardation formed by monoaxial stretching is usually preferably 2,000 nm or more and 10,000 nm or less.

The aromatic polycarbonate resin is preferably a polymer produced by a known method from a bisphenol compound such as 2,2-bis(4-hydroxyphenyl)alkane or 2,2-bis(4-hydroxy-3,5-dihalogenophenyl)alkane. The skeleton of the polymer may contain a structural unit that has an ester bond containing a structural unit derived from an aliphatic diol. A bisphenol A polycarbonate resin derived from 2,2-bis(4-hydroxyphenyl)propane is preferable. The molecular weight in terms of viscosity-average molecular weight is 17,000 to 40,000 and preferably 22,000 to 34,000 from the viewpoints of shapability and mechanical strength.

A preferable example of the aromatic polycarbonate resin is Iupilon (trade name, glass transition temperature: 145° C. to 150° C.) produced by Mitsubishi Engineering-Plastics Corporation.

The functional sheet according to the present invention is produced by performing lamination that involves sandwiching the functional layer between the aromatic polycarbonate sheets or films. A laminate is typically prepared by placing aromatic polycarbonate sheets or films on both sides of a functional layer with an adhesive layer therebetween, press-attaching the resulting stack, and if needed, curing the adhesive layers.

One example of an implementation in which a polyvinyl alcohol polarizing film is used as a functional layer is a method that includes continuously applying an adhesive agent to a long polyvinyl alcohol polarizing film, drying the applied adhesive agent, superposing the adhesive agent-coated surface on a long aromatic polycarbonate sheet, press-attaching the resulting stack, continuously applying an adhesive agent to the other surface of the polarizing film again, drying the applied adhesive agent, superimposing the adhesive agent-coated surface on another long aromatic polycarbonate sheet, press-attaching the resulting stack, winding the resulting product into a roll or cutting the resulting product into a desired size, and if needed, performing post curing.

Protective Film-Attached Functional Sheet

The protective film-attached functional sheet according to the present invention is usually prepared by placing protective films, which are continuous films, on both surfaces of a continuous or individual functional sheet, and press-bonding the stack of the sheet and films.

Press-bonding is typically conducted by allowing the stack to pass between two rolls while being heated to a surface temperature of 60° C. to 80° C. as needed at a pressure of 10 kg/cm or less.

The method for laminating the protective film according to the present invention may be any method by which a structure of the protective film according to the present invention is obtained at the final stage.

Injection-Molded Lens

The present invention also provides a method for producing a functional, aromatic polycarbonate injection-molded lens, the method including preparing a protective film-attached functional sheet by bonding a protective film onto a functional sheet that includes aromatic polycarbonate sheets or films and a functional layer sandwiched between the aromatic polycarbonate sheets or films, the functional layer being selected from a polyvinyl alcohol polarizing film layer, a photochromic layer, and a combination thereof; punching the protective film-attached functional sheet into a desired shape; heat-bending the punched piece; detaching the protective film; loading the resulting piece onto a mold; injection-molding an aromatic polycarbonate resin; and taking out the resulting molded product. In this method, the protective film is a polyolefin resin film that includes at least two layers, namely, a base layer formed of a polypropylene having a melting point equal to or higher than a glass transition temperature of the aromatic polycarbonate and an adhesive layer disposed on one surface of the base layer, the adhesive layer being formed of a resin composition containing a polyolefin rubber and a polyolefin having a melting point lower than the glass transition temperature but equal to or higher than the temperature 15° C. lower than the glass transition temperature. Furthermore, the heat-bending involves gradually deforming the punched piece at most at a temperature 15° C. to 5° C. lower than the glass transition temperature of the aromatic polycarbonate.

In other embodiments of the present invention, in the method for producing an aromatic polycarbonate injection-molded lens, the protective film is a polyolefin resin film that includes at least three layers: a base layer formed of a polypropylene having a melting point equal to or higher than the glass transition temperature of the aromatic polycarbonate; an adhesive layer disposed on one surface of the base layer and formed of a resin composition containing a polyolefin having a melting point lower than the glass transition temperature but equal to or higher than a temperature 15° C. lower than the glass transition temperature, and a polyolefin rubber; and an intermediate layer disposed between the base layer and the adhesive layer and formed of a polyolefin having a melting point 40° C. to 5° C. lower than the glass transition temperature of the aromatic polycarbonate.

The protective film-attached functional sheet is punched to a desired shape, for example, a puck shape having a diameter of 80 mm or a slit shape obtained by removing equal-width portions from both sides (vertical) of the puck in a parallel manner. Punching is performed placing the protective film-attached functional sheet and a backing plate on a press machine equipped with a Thomson blade so that the functional sheet and the backing plate are stacked on top of each other by considering their orientations and the like.

The punched piece is pre-heated at a temperature 15° C. to 5° C. lower than the glass transition temperature and preferably at a temperature of 130° C. or higher, by using a mold having a desired shape, usually a partial sphere mold, the pre-heated punched piece is placed on a female mold for heat bending, and the pressure is decreased or increased so that the punched piece is gradually deformed over usually 0.5 to 10 minutes during which the temperature of the punched piece is 15° C. to 5° C. lower than the glass transition temperature of the aromatic polycarbonate at most, usually, at 135° C. to 145° C. and during which a male mold is pressed against the female mold to complete heat bending.

It is presumed that the adhesive layer of the protective film partly melts at the heat-bending temperature. However, unlike protective films of the related art, adhering matters are not found on the section end surfaces and no white streaks are generated.

The polyolefin used in the adhesive layer of the protective film is a polyolefin having a melting point substantially within the maximum temperature range of heat-bending when the polyolefin is used alone. However, when the polyolefin is blended to form a resin composition for forming an adhesive layer, the melting peak becomes unclear although it is not impossible to identify the melting point peak. The adhesive layer of a protective film according to related art shows a clear melting point peak. The adhesive layer according to the present invention differs from that of the related art in that the melting point peak is unclear and is high.

The adhesive layer according to the present invention does not separate and flow out from the base layer due to its high viscosity even during heat bending. Thus, presumably, the adhesive layer does not readily melt and adhere to the punched end surfaces.

The heat-bent punched piece after detachment of its protective film is placed on a mold of an injection molding machine at a particular temperature and an aromatic polycarbonate resin molding material for optical use is injected to produce an aromatic polycarbonate injection-molded lens.

The injection molding according to the present invention is performed at a resin temperature of 260° C. to 340° C. and preferably 270° C. to 310° C., an injection pressure of 50 to 200 MPa and preferably 80 to 150 MPa, and a mold temperature of 60° C. to 130° C. and preferably 80° C. to 125° C.

The aromatic polycarbonate injection-molded lens produced as described above is subjected to a hard coat treatment as needed and then a mirror coat or an antireflection coat, for example, is formed thereon to obtain a product.

The material for the hard coat must have good appearance and excellent adhesiveness to the underlying aromatic polycarbonate and an inorganic layer, such as a mirror coat or an antireflection coat, subsequently formed thereon. From this viewpoint, for the processing conditions of the hard coat, the firing temperature is preferably lower than the glass transition temperature but equal to or higher than the temperature 50° C. lower than the glass transition temperature of the aromatic polycarbonate sheet. In particular, when the firing temperature is about 120° C. and is equal to or higher than the temperature 40° C. lower than the glass transition temperature but lower than the temperature 15° C. lower than the glass transition temperature, the time taken for firing the hard coat is about 0.5 to 2 hours.

The present invention will now be described through Examples.

Examples

Functional Sheet

A functional sheet (Iupilon Pola produced by Mitsubishi Engineering-Plastics Corporation) having a total thickness of 0.6 mm, a width of 300 mm, and a length of 340 mm, and prepared by laminating aromatic polycarbonate sheets having a thickness of 0.3 mm onto both surfaces of a polarizing film having a thickness of 30 μm by using thermosetting polyurethane bonding layers was used. Protective films described in Table 1 were press-bonded (load: 9 kg/cm) onto both surfaces of the functional sheet by using heated rolls (roll surface temperature: 65° C.). (Examples 1 and 2 and Comparative Examples 1 and 2)

Next, the protective film-attached functional sheet was punched.

Punching was conducted according to a common method, i.e., press-punching using a Thomson blade. As described above in the section of the Technical Problem, in order to produce a punched piece with which the frequency of occurrence of white streaks is significantly increased, a single-edge Thomson blade facing outward and having 5 μm of its tip removed was used in punching.

Shape of Punched Piece:

Two equal portions that lay on two sides of a straight line passing the center of a puck having a diameter of 80 mm were removed in a parallel manner from the puck to form a slit shape, a capsule shape, or a rounded rectangular shape having a width of 55 mm in a vertical section. Small protrusions for positioning were disposed at arc portions on the two sides that remained unremoved. The punching direction was determined so that the longitudinal direction of the punched piece coincided with the direction of axis of absorption of the polarizing film.

The punched piece produced as above was heat-bent.

Heat-bending was performed by using a continuous heat bending apparatus and involved pre-heating the punched piece in a pre-heater; placing the pre-heated punched piece onto a partial sphere female mold having a particular temperature and curvature; compressing the punched piece by using a silicon rubber male mold and at the same time starting pressure reduction to cause the punched piece to adsorb onto the female mold; withdrawing the male mold; retaining the punched piece adsorbing to the female mold in a hot air atmosphere at a particular temperature for a particular length of time; and taking out the retained piece.

In the process described above, pre-heating of the punched piece was conducted at a 136° C. atmosphere temperature. The female mold was an 8R-equivalent (radius: about 65.6 mm) partial sphere having a surface temperature of 138° C. Pressing with the silicon rubber male mold was conducted for 4 seconds. The adsorption to the female mold was conducted for 9 minutes in an atmosphere in which the blown hot air temperature was 166° C.

These heat-bending conditions were selected as with the conditions of the punching blade so that the frequency of occurrence of white streaks was high.

The punched section end surfaces of the heat-bonded punched sheet was observed to observe the protective film (hereinafter this observation is referred to as end surface observation). Occurrence of wrinkles of the protective film, clouding, and warps of surfaces were also observed and the detachability was checked. The procedures are described below and the results are shown in Table 1.

The protective films were detached from the heat-bent punched piece produced as described above, and the punched piece was loaded onto a mold cavity of an injection molding machine. An aromatic polycarbonate (blended with a UV absorber) was then injection-molded. The injection molding conditions were set to a resin temperature of 310° C., an injection pressure of 125 MPa, a retention pressure of 63 MPa, a mold temperature of 80° C., and an injection cycle of 70 seconds.

The obtained injection-molded lens was observed as to occurrence of white streaks. The results are shown in Table 1 below.

Injection-Molded Resin:

An aromatic polycarbonate resin (viscosity-average molecular weight: 23000, trade name: Iupilon CLS3400 produced by Mitsubishi Engineering-Plastics Corporation)

Mold for Injection Molding

The mold was for plano lenses with no focusing power. The mold cavity had an 8R-equivalent partial sphere having a diameter slightly smaller than about 80 mm, was aberration-corrected, and had a total thickness of 2 mm including an insert sheet. A projection with a penetrating hole for use in post-processing of lenses or the like was formed at an end opposite to the gate. The sheet-mounting portion was the concave surface side. The mold cavity had recesses for receiving the small protrusions of the punched piece for positioning so that the straight portions of the slit or rounded rectangle were orthogonal to the direction that extends from the gate to the opposite end.

In this manner, the molten resin travels while spreading from the gate so as to form a partial spherical shape and, on the concave surface side, hits the straight portions of the punched piece. Then the molten resin passes over the punched piece and reaches the projection at the end opposite to the gate as it contracts.

Melting Point:

The melting point was measured by DSC at a heating rate of 10° C./min and a sample weight of 10 mg.

End Surface Observation:

At end surfaces of the heat-bent punched piece, the protective film protrudes from the section end surfaces of the functional sheet and collapses. Observation reveals that the collapsed protruded parts are attached to the section walls of the functional sheet.

Microscopic observation was conducted and the extent of collapsed protrusions from the end surfaces was measured by subtracting the thickness of the protective film.

Occurrence of White Streaks:

White streaks that extended in the direction of the flow of the injection-molded resin from the section end surfaces of the punched piece to the boundary between the punched piece and the injection-molding resin was observed with naked eye and evaluated. Typically, noticeable white streaks have a length of about 1 to 2 cm; however, small white streaks smaller than 1 cm and about several millimeters were also assumed as a defect.

Occurrence of Detachment Wrinkles:

Detachment wrinkles of the protective film were observed with naked eye and evaluated. The detachment wrinkles were wrinkles that occurred in the concave surface of the heat-bent product after the heat-bending process and that had a length of about 5 to 10 mm, and formed a void at the interface between the adhesive layer of the protective film and the protective layer of the functional sheet.

Detachability:

The ease of detaching the protective film after heat-bending was evaluated by testing whether the protective film was easily peelable with hands.

Irregularities:

The irregularities, which were formed by the change in shape of the surface of the protective sheet of the functional layer as a result of heat-bending and which were constituted by recesses having a depth of about 20 to 100 μm and a length or width of 100 to 600 μm, were observed with naked eye under reflected light of a fluorescent lamp and evaluated.

Warps of Surfaces:

The change in shape of the surface of the protective sheet of the functional layer after heat-bending was observed with naked eye by observing a heat-bent product over a fluorescent lamp.

TABLE 1

|  |  | Example 1 | Example 2 | Comparative Example 1 | Comparative Example 2 |
|---|---|---|---|---|---|
|  | Production method | Co-extrusion | Co-extrusion | Co-extrusion | Double |
|  | Total thickness | 72 | 69 | 72 | 90 |
| Base layer | Type | PP1 | PP1 | PP1 | PP1 |
|  | Thickness | 19 | 21 | 41 | 41 |
|  | Melting point | 158 | 157 | 156 | 160 |
| Auxiliary layer | Type | PP2 | PP2 | — | — |
|  | Thickness | 32 | 29 | — | — |
|  | Melting point | 136 | 137 | — | — |
| Adhesive layer | Type | PPOR1 | PPOR2 | PE2 | PE1 |
|  | Thickness | 21 | 19 | 31 | 49 |
|  | Melting point | 138 | 136 | 98 | 119 |
| Evaluation results | Detachment wrinkles | A | A | A | F |
|  | Clouding | A | A | A | F |
|  | Detachability | A | A | A | A |
|  | Warps of surfaces | A | A | A | A |
|  | Irregularities | A | A | A | A |
| White streaks | Presence or absence | A | A | F | F |
|  | Rate of | 0% | 0% | 92% | 98% |

TABLE 1-continued

|  | Example 1 | Example 2 | Comparative Example 1 | Comparative Example 2 |
| --- | --- | --- | --- | --- |
| occurrence (%) | | | | |

Note)
The melting point of the adhesive layer described in the table is the melting point of the low-density polypropylene.
PPOR1: A composition containing a low-density polypropylene having a melting point of about 140° C. and an ethylene-propylene-diene tertiary copolymer
PPOR2: A composition containing a low-density polypropylene having a melting point of about 140° C. and a propylene-(1-butene) copolymer
PP1: A low-density polypropylene having a melting point of about 160° C.
PP2: A low-density polypropylene having a melting point of about 140° C.
PE1: A high-density polyethylene having a melting point of about 120° C.
PE2: A high-density polyethylene having a melting point of about 100° C.

The melting temperatures described above were listed by confirming that the melting peak of the resin measured with a differential scanning calorimeter (DSC) was near the value listed in the catalog.

White streaks A: No white streaks are present in the lens.

White streaks F: White streaks several millimeters in size are present in the lens.

Detachment wrinkles A: No detachment wrinkles are present in the lens.

Detachment wrinkles F: Detachment wrinkles are present in the lens.

Detachability A: The protective film can be smoothly detached.

Detachability F: The protective film cannot be easily detached.

Irregularities A: No irregularities are present on the protective sheet of the functional layer after detachment of the protective film.

Irregularities F: Irregularities are present on the protective sheet of the functional layer after detachment of the protective film.

Clouding A: No clouding is present in the injection-molded lens.

Clouding F: Clouding is present in the injection-molded lens.

INDUSTRIAL APPLICABILITY

The invention according to the subject application can provide a protective film-attached functional sheet from which an aromatic polycarbonate injection-molded lens can be produced in which defects, such as white streaks, detachment wrinkles, and irregularities derived from the production environment during working of the functional sheet are significantly reduced.

This application is based on Japanese Patent Application No. 2014-236743 filed Nov. 21, 2014, in Japan and the contents thereof are incorporated as a part of the contents of the present application.

The detailed description described above would provide full understanding of the present invention. However, the detailed description and specific examples are desirable modes of the present invention and are described herein for the purpose of elucidation only. This is because various modifications, alterations, etc., are obvious to a person skilled in the art.

The applicant has no intention to dedicate any of the embodiments described herein to the public and those modifications and alternative proposals disclosed herein which may not be covered by literal meaning of the claims are also part of the invention under doctrine of equivalents.

In the description and claims, nouns and similar reference terms should be interpreted to include both singular and plural forms unless otherwise noted or unless clearly denied from the context. Examples and words (such as etc., and the like, and or the like) that indicate examples used in the description are merely intended to promote understanding of the present invention and do not limit the scope of the present invention unless described in claims.

The invention claimed is:

1. A protective film-attached functional sheet comprising a functional sheet and a protective film bonded to the functional sheet, the functional sheet including aromatic polycarbonate sheets or films and a functional layer sandwiched between the aromatic polycarbonate sheets or films, the functional layer being a polyvinyl alcohol polarizing film layer, a photochromic layer, or a combination thereof, wherein the protective film is a polyolefin resin film that includes at least two layers that are a base layer formed of a polypropylene having a melting point equal to or higher than a glass transition temperature of the aromatic polycarbonate and an adhesive layer disposed on one surface of the base layer and being formed of a resin composition containing a polyolefin rubber and a polyolefin having a melting point lower than the glass transition temperature but equal to or higher than a temperature 15° C. lower than the glass transition temperature.

2. The protective film-attached functional sheet according to claim 1, wherein the polypropylene constituting the base layer is a low-density polypropylene having a melting point of 150° C. to 170° C. and the base layer has a thickness of 10 to 60 μm.

3. The protective film-attached functional sheet according to claim 1, wherein the polyolefin constituting the adhesive layer is a low-density polyolefin having a melting point of 135° C. to 145° C. and the adhesive layer has a thickness of 5 to 30 μm.

4. The protective film-attached functional sheet according to claim 1, wherein a polyolefin resin layer having a melting point lower than that of the base layer is disposed between the base layer and the adhesive layer.

5. The protective film-attached functional sheet according to claim 4, wherein the polyolefin resin layer has a low density, a melting point of 120° C. to 145° C., and a thickness of 20 to 60 μm.

6. A method for producing a functional aromatic polycarbonate injection-molded lens, comprising preparing a protective film-attached functional sheet by bonding a protective film onto a functional sheet that includes aromatic polycarbonate sheets or films and a functional layer interposed between the aromatic polycarbonate sheets or films, the functional layer being selected from a polyvinyl alcohol polarizing film layer, a photochromic layer, and a combination thereof; punching the protective film-attached functional sheet into a desired shape; heat-bending the punched piece; detaching the protective film; loading the resulting piece onto a mold; injection-molding an aromatic polycarbonate resin; and taking out the resulting molded product, wherein the protective film is a polyolefin resin film that includes at least two layers that are a base layer formed of a polypropylene having a melting point equal to or higher than a glass transition temperature of the aromatic polycarbonate and an adhesive layer disposed on one surface of the base layer, the adhesive layer being formed of a resin composition containing a polyolefin rubber and a polyolefin having a melting point lower than the glass transition temperature but equal to or higher than a temperature 15° C. lower than the glass transition temperature.

7. The method for producing an aromatic polycarbonate injection-molded lens according to claim 6, wherein the heat-bending involves gradually deforming the punched piece at most at 15° C. to 5° C. lower than the glass transition temperature of the aromatic polycarbonate.

8. The method for producing an aromatic polycarbonate injection-molded lens according to claim 6, wherein the polypropylene constituting the base layer is a low-density polypropylene having a melting point of 150° C. to 170° C. and the base layer has a thickness of 10 to 60 µm.

9. The method for producing an aromatic polycarbonate injection-molded lens according to claim 6, wherein the polyolefin constituting the adhesive layer is a low density polyolefin having a melting point of 135° C. to 145° C. and the adhesive layer has a thickness of 5 to 30 µm.

10. The method for producing an aromatic polycarbonate injection-molded lens according to claim 6, wherein a polyolefin resin layer having a melting point lower than that of the base layer is disposed between the base layer and the adhesive layer.

11. The method for producing an aromatic polycarbonate injection-molded lens b according to claim 10, wherein the polyolefin resin layer has a low density, a melting point of 120° C. to 145° C., and a thickness of 20 to 60 µm.

* * * * *